Feb. 21, 1939.  P. N. DANN  2,148,059
ENTRANCE CAP
Filed Oct. 23, 1937  2 Sheets-Sheet 1
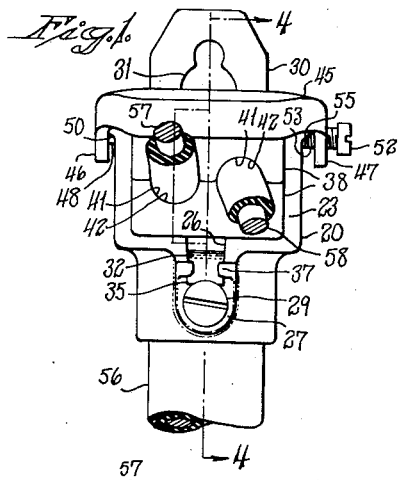
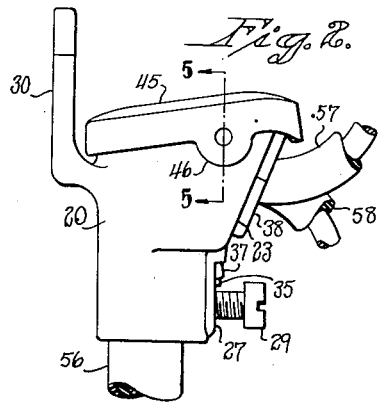
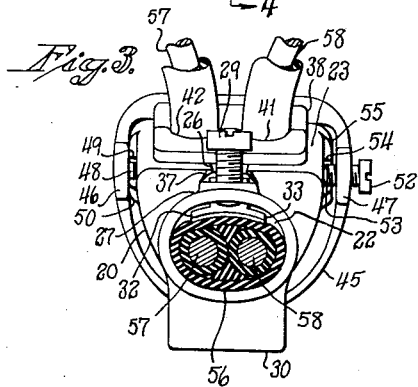
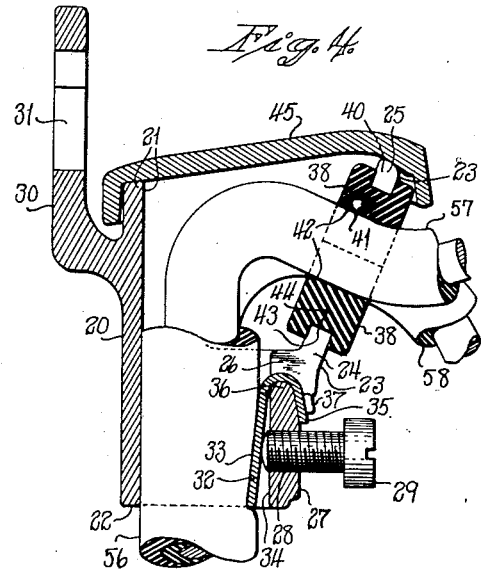
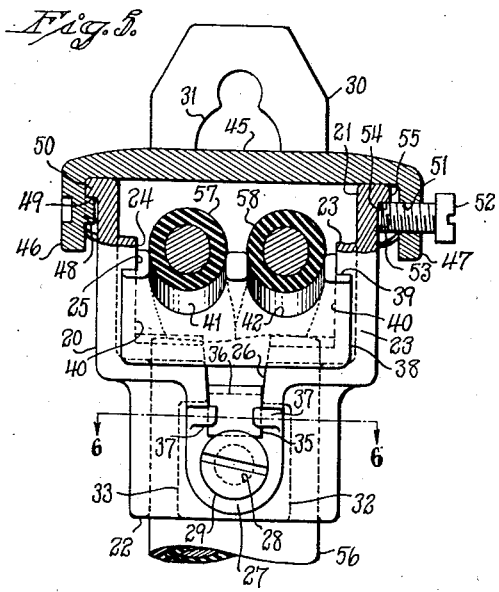
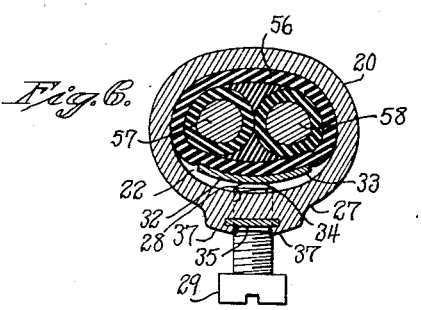
Inventor
Paul N. Dann
By Seymour Earle & Nichols
Attorneys Feb. 21, 1939.   P. N. DANN   2,148,059
ENTRANCE CAP
Filed Oct. 23, 1937   2 Sheets-Sheet 2
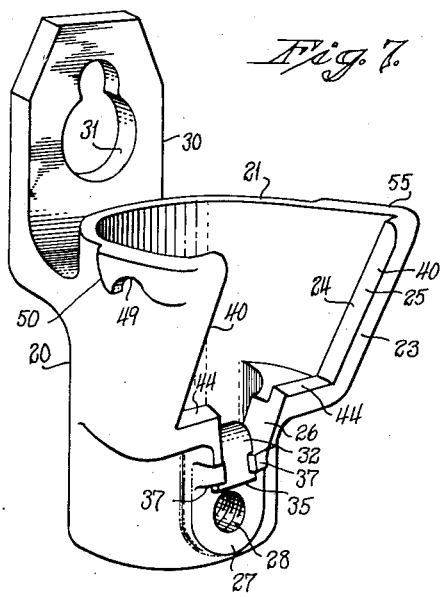
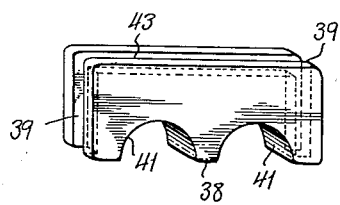
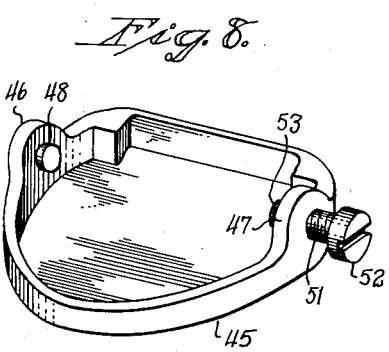
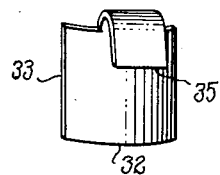
Inventor
Paul N. Dann Patented Feb. 21, 1939

2,148,059

UNITED STATES PATENT OFFICE 2,148,059

ENTRANCE CAP

Paul N. Dann, New Haven, Conn., assignor to The Rattan Manufacturing Company, New Haven, Conn., a corporation of Connecticut Application October 23, 1937, Serial No. 170,593

2 Claims. (Cl. 174—81)

This invention relates to improvements in entrance-caps for electrical installations, and more particularly to an entrance-cap to be mounted on the side of a building to serve as a protective anchor for electric conductors leading from a source of electric-current supply exterior to the building.

Entrance-caps of the nature herein set forth, are usually installed high up on the sides of buildings by workmen working in precarious positions on ladders, and it is highly important that the entrance-caps shall consist of a minimum number of separate parts, and that the entrance-caps and the parts thereof shall be capable of simple, expeditious installation by a minimum of difficulty and minimum number of attaching or assembling operations.

One object of this invention, therefore, is to provide an improved entrance-cap for electrical installations formed of simple elements readily manufactured and readily assembled and installed to produce a durable, efficient construction at minimum cost.

With the above and other objects in view, as will appear to those skilled in the art from the present disclosure, this invention includes all features in the said disclosure which are novel over the prior art.

In the accompanying drawings, in which one way of carrying out the invention is shown for illustrative purposes:

Fig. 1 is a front elevation of an entrance-cap for electrical installations, constructed in accordance with the present invention;

Fig. 2 is a left-side elevation of Fig. 1;

Fig. 3 is a bottom-plan view of Fig. 1;

Fig. 4 is a vertical central section on line 4—4 of Fig. 1;

Fig. 5 is a front elevation similar to Fig. 1, but with a portion thereof shown in section on the line 5—5 of Fig. 2;

Fig. 6 is a horizontal sectional view on line 6—6 of Fig. 5;

Fig. 7 is a perspective view of the body-member;

Fig. 8 is an under-side perspective view of the cover-plate;

Fig. 9 is a perspective view of one of the two insulator-blocks; and

Fig. 10 is a perspective view of the cable-gripping member.

In the description and claims, the various parts are identified by specific names for convenience, but they are intended to be as generic in their application as the prior art will permit.

Referring to the drawings, 20 is a hollow body-member, which may be made of malleable iron, and has an open top 21 and an open bottom 22. The front wall 23 of the body-member has a slot 24 comprising an upper large slot-portion 25 and a central lower small slot-portion 26 leading from the slot-portion 25. The front lower wall-portion 27 of the body-member 20 is provided with a threaded opening 28 adapted to threadedly receive a screw 29. A mounting-arm 30 is preferably formed integral with the body-member 20 and is preferably provided with a keyhole-slot 31 to facilitate securing the body-member to the wall of a building or the like.

A cable-gripping member or shim 32, which may be made of sheet steel, has a cable-gripping plate 33 inside of the body-member 20 and located more or less adjacent the front inner-wall surface 34 of the front wall-portion 27 of the body-member. The cable-gripping member 32 has an anchor-portion 35 engaging over the lower edge 36 of the lower slot-portion 26 and firmly anchored in place by means of two distorted or swaged-over portions 37, which are integral with the body-member 20. Two insulator-members 38, which may be identical, have side-slots 39 adapted to be slidably engaged by the edge-portions 40 of the slot-portion 25. The insulator-members 38 are oppositely arranged to have their recesses cooperate to provide two openings or holes 42. The groove 43 in the lower insulator-member 38 is engaged by the bottom edge-portions 44 of the slot-portion 25.

A cover-cap or plate 45 is adapted to be detachably mounted in position as shown, and has a downwardly-extending pair of ears 46 and 47. Ear 46 has a lug 48, preferably integral, which is adapted to engage in the recess 49 formed in the under side of the lug 50 integrally formed as part of the body-member 20. Ear 47 has a threaded opening 51 adapted to threadedly receive a screw 52, the end 53 of which is adapted to engage in a notch 54 formed in the lower edge of an integral lug 55, which may be identical with the parts 49 and 50 respectively, on the other side of the body-member 20. Thus, the cover-plate 45 can be easily attached in or detached from position by merely manipulating the single screw 52.

By screwing in the screw 29 (Fig. 4), the screw 29 forces the cable-gripping plate 32 against the cable 56 to firmly grip or lock the cable in the opening in the lower portion of the body-member 20. Conductors 57 and 58, forming part of the cable 56, extend therefrom through the openings 42 in the insulation-members 38 to an external source of electric power. Where the cable is covered with a sheath formed of wires serving as a neutral, the ends of these wires may be gathered or twisted together as is usual and extended outward through the slot-portion 26 beneath the lower insulator-member 38.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. An entrance-cap for electrical installations, comprising: a hollow body-member having an open top and an open bottom and a slot open at the top; a cable-gripping member having a cable-gripping plate inside said hollow body-member and adjacent the inner-wall surface thereof and having an anchor-portion engaging over and supported by the lower edge of said slot; means engaged in the body-member below said slot for forcing said cable-gripping plate against electric-conductor means adapted to extend into the lower end of said body-member; insulation-means adapted to be located in said slot above said anchor-portion and having opening-means for electric-conductor means; and a cover-plate adapted to cover the open top of said body-member and extend over said insulation-means.

2. An entrance-cap for electrical installations, comprising: a hollow body-member having an open top and an open bottom and a slot open at the top; a cable-gripping member having a cable-gripping plate inside said hollow body-member and adjacent the inner-wall surface thereof and having an anchor-portion engaging over and supported by the lower edge of said slot and secured to said body-member by distorted means integral with said body-member; screw means engaged in the body-member below said slot for forcing said cable-gripping plate against electric-conductor means, adapted to extend into the lower end of said body-member; insulation-means adapted to be located in said slot above said anchor-portion and having opening-means for electric-conductor means; and a cover-plate adapted to cover the open top of said body-member and extend over said insulation-means.

PAUL N. DANN.